(12) United States Patent
Nattar Ranganathan et al.

(10) Patent No.: US 12,147,932 B2
(45) Date of Patent: Nov. 19, 2024

(54) TRACEABILITY SYSTEM FOR BULK COMMODITY SUPPLY CHAIN

(71) Applicant: Microsoft Technology Licensing, LLC, Redmond, WA (US)

(72) Inventors: Vaishnavi Nattar Ranganathan, Woodinville, WA (US); Upinder Kaur, West Lafayette, IN (US); Peeyush Kumar, Seattle, WA (US); Ranveer Chandra, Kirkland, WA (US); Michael McNab Bassani, Seattle, WA (US); Vishal Jain, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 17/647,924

(22) Filed: Jan. 13, 2022

(65) Prior Publication Data
US 2023/0222433 A1     Jul. 13, 2023

(51) Int. Cl.
*G06Q 10/0833*     (2023.01)
*G06Q 30/018*     (2023.01)

(52) U.S. Cl.
CPC ....... *G06Q 10/0833* (2013.01); *G06Q 30/018* (2013.01)

(58) Field of Classification Search
CPC ................. G06Q 10/0833; G06Q 30/018
See application file for complete search history.

(56) References Cited

U.S. PATENT DOCUMENTS

| 10,657,486 B1 * | 5/2020 | Wolter ............ G06Q 10/0833 |
| 2005/0205674 A1 | 9/2005 | Herrman et al. |
| 2006/0004484 A1 | 1/2006 | Hornbaker et al. |
| 2009/0266891 A1 | 10/2009 | Santucci et al. |
| 2013/0184859 A1 | 7/2013 | Sell |
| 2018/0232693 A1 * | 8/2018 | Gillen ............... G06Q 10/0834 |

(Continued)

FOREIGN PATENT DOCUMENTS

WO     2017011657 A1     1/2017

OTHER PUBLICATIONS

L. Ruiz-Garcia, A model and prototype implementation for tracking and tracing agricultural batch products along the food chain, 2010, p. 112-114 (Year: 2010).*

(Continued)

*Primary Examiner* — Ibrahim N El-Bathy
(74) *Attorney, Agent, or Firm* — Alleman Hall & Tuttle LLP

(57) ABSTRACT

A traceability system for a bulk commodity supply chain is provided. The system includes a tracking device, a location determination subsystem, and at least one computing device having at least one processor. The location determination subsystem is configured to determine positional information of the tracking device while placed in a bulk commodity traveling along the bulk commodity supply chain. The processor receives the positional information from the location subsystem, extracts positional values from the positional information, and processes the positional values to identify motion primitives. A modeling tool is applied to the identified motion primitives to produce a positional path of the tracking device, which is output, for example, via a user interface. The positional path represents travel of the bulk commodity along the supply chain.

17 Claims, 9 Drawing Sheets

(56) References Cited

U.S. PATENT DOCUMENTS

| | | | | |
|---|---|---|---|---|
| 2020/0100115 | A1* | 3/2020 | Skaaksrud | H04W 12/108 |
| 2020/0202295 | A1* | 6/2020 | Perez | G06Q 10/0833 |
| 2020/0259650 | A1* | 8/2020 | Montemurro | H04L 9/321 |
| 2020/0356740 | A1* | 11/2020 | Principato | G06F 16/90335 |
| 2022/0067651 | A1* | 3/2022 | Kawaguchi | G06Q 10/0833 |
| 2022/0076273 | A1* | 3/2022 | Cabigon | G06Q 30/018 |
| 2022/0129000 | A1* | 4/2022 | Ingvalson | G06Q 10/06314 |
| 2022/0187101 | A1* | 6/2022 | Bezanson | G01D 3/08 |
| 2022/0198387 | A1* | 6/2022 | Hansen | H04L 9/0825 |
| 2022/0222724 | A1* | 7/2022 | Graham | G06Q 30/0201 |
| 2022/0357463 | A1* | 11/2022 | Nurminen | G06Q 10/0833 |

OTHER PUBLICATIONS

Aung, et al., "Traceability in a Food Supply Chain: Safety and Quality Perspectives", in Journal of Food Control, vol. 39, May 2014, pp. 172-184.

Corbley, Andy, "Google is Creating Tools to Tackle Food Waste and Hunger at its Moonshot Factory", Retrieved From: https://www.goodnewsnetwork.org/googles-x-project-delta-food-waste-program/, Dec. 22, 2020, 5 Pages.

Farid, et al., "Delineating Site-Specific Management Zones for Precision Agriculture", in Journal of Agricultural Science, vol. 154, Issue 2, Mar. 2016, pp. 273-286.

Khatib, et al., "Multiple Sensor Fusion for Mobile Robot Localization and Navigation using the Extended Kalman Filter", in Proceedings of 10th International Symposium on Mechatronics and its Applications, Dec. 8, 2015, 5 Pages.

Khosla, et al., "Use of Site-Specific Management Zones to Improve Nitrogen Management for Precision Agriculture", in Journal of Soil and Water Conservation, vol. 57, Issue 6, Nov. 2002, pp. 513-518.

Mirabelli, et al., "Blockchain and Agricultural Supply Chains Traceability: Research Trends and Future Challenges", in Journal of Procedia Manufacturing, vol. 42, Jan. 2020, pp. 414-421.

Moore, et al., "A Generalized Extended Kalman Filter Implementation for the Robot Operating System", in Book of Intelligent Autonomous Systems 13, Sep. 3, 2015, pp. 335-348.

Opara, Linus U., "Traceability in Agriculture and Food Supply Chain: A Review of Basic Concepts, Technological Implications, and Future Prospects", in Journal of Food, Agriculture and Environment, vol. 1, Issue 1, Jan. 2003, pp. 101-106.

Rub, et al., "Exploratory Hierarchical Clustering for Management Zone Delineation in Precision Agriculture", in Proceedings of Industrial Conference on Data Mining, Aug. 30, 2011, pp. 161-173.

Sarpong, Sam, "Traceability and Supply Chain Complexity: Confronting the Issues and Concerns", in Journal of European Business Review, vol. 26, Issue 3, May 6, 2014, pp. 271-284.

Silva, et al., "Performance Evaluation of the Extended Kalman Filter and Unscented Kalman Filter", in Proceedings of International Conference on Unmanned Aircraft Systems, Jun. 9, 2015, pp. 733-741.

Bisgaard, et al., "Flow-following sensor devices: A tool for bridging data and model predictions in large-scale fermentations", in journal of Computational and Structural Biotechnology Journal, vol. 18, Jan. 1, 2020, 12 Pages.

"International Search Report and Written Opinion Issued in PCT Application No. PCT/US2022/052914", Mailed Date: Apr. 28, 2023, 11 Pages.

* cited by examiner

TRACEABILITY SYSTEM FOR BULK COMMODITY SUPPLY CHAIN

BACKGROUND

Increasing emphasis is being placed upon sustainability of various commodities that travel through supply chains to reach end consumers. Consumers are coming to demand that the items they purchase have been produced in a socially, environmentally, and economically sustainable manner. For example, every product obtained through a supply chain carries with it a carbon footprint, water usage, raw material usage, etc. that were required to produce and transport the product to the consumer. Opportunities exist for technical solutions to be developed that enable consumers, businesses, and regulatory agencies alike to gain insights as to the sustainability of commodities, and particularly bulk commodities, passing through such supply chains, and deepen understanding of how bulk commodities move through supply chains to technologically enable increased accountability for the handling of those bulk commodities throughout the supply chains.

SUMMARY

To address the issues discussed herein, a traceability system for a bulk commodity supply chain is provided. According to one aspect, the traceability system comprises a tracking device and at least one computing device. The tracking device is configured to be placed in a bulk commodity traveling along a bulk commodity supply chain. The traceability system further comprises a location determination subsystem configured to determine positional information of the tracking device while the tracking device is traveling along the bulk commodity supply chain. The at least one computing device has at least one processor, which is configured to receive the positional information from the location determination subsystem and extract positional values form the positional information. The processor processes the positional values to identify motion primitives, and applies a modeling tool to the identified motion primitives to produce a positional path of the tracking device. The positional path is outputted, for example, by being displayed via a user interface on a display or being transmitted to a storage location or downstream program for further processing. The positional path represents travel of the bulk commodity along the bulk commodity supply chain.

According to one aspect, the tracking device is a sensor pack that includes at least one of a Global Positioning System (GPS) module configured to determine GPS coordinates of the tracking device and an Inertial Measurement Unit (IMU) module, the location subsystem includes the GPS and IMU, and the positional information is stored in memory of the tracking device and transmitted to the computing device.

According to another aspect, the tracking device includes a passive radio frequency (RF) tag that is configured to emit a tracking signal when bombarded by radio waves from an interrogating RF tag sensor, the passive radio frequency tag and interrogating RF tag sensor forming at least a portion of the location determination subsystem.

According to another aspect, the location determination subsystem includes one or a plurality of stationary sensors positioned external to the tracking device and configured to detect a position of the tracking device to thereby determine the positional information, the stationary sensors being selected from the group comprising wireless access points and RF tag sensors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the case of bulk commodities, sustainability can be difficult to measure because the traceability of such bulk commodities through various supply chain operations is difficult to achieve. Aggregation and intermixing of bulk commodities at various stages in the supply chain can lead to loss of identifying information of the bulk commodities, making the bulk commodities difficult to trace back to their sources. The issue of traceability is particularly impactful for high-volume, low-cost products such as grains, as information that is lost between the harvest stage and the storage stage may lead to the inability to trace portions of harvested crops infected by diseases or bacteria. This information loss can lead to mass recalls that result in large amounts of food loss. Additionally, with intermixing of harvested crops, it can be challenging, if not impossible, to differentiate between grains that are grown in the presence of herbicides and/or fertilizers and grains that are grown in the absence of chemical growth aids. While some solutions to collecting crop data at farming locations have been implemented, a technical challenge exists in automating and effectively tracking bulk commodities such as agricultural crops from a point of harvest to a place of storage and/or distribution.

Utilizing the systems and methods described herein, traceability points can be identified between harvest, storage, and transport of bulk commodities across a supply chain. For example, in an agricultural supply chain, crops may be tracked via traceability points including pre-planting activities, sowing, growing, harvest, storage, transport, processing, distribution to buyers, and, ultimately, distribution to consumers. This information can be used to reduce loss and increase the sustainability of supply chain operations, as described below. Although described primarily in the context of agricultural supply chains, the systems and methods described herein also have applicability to bulk commodities outside of the agricultural context, such as machine parts (e.g., nuts, bolts, washers), scrap (e.g., metal, plastic, and glass) for recycling, bulk recycled aggregate plastic pellets, forest products, coal, or any other dry (i.e., non-liquid, non-gas) material transported and distributed in bulk.

Figure 1:
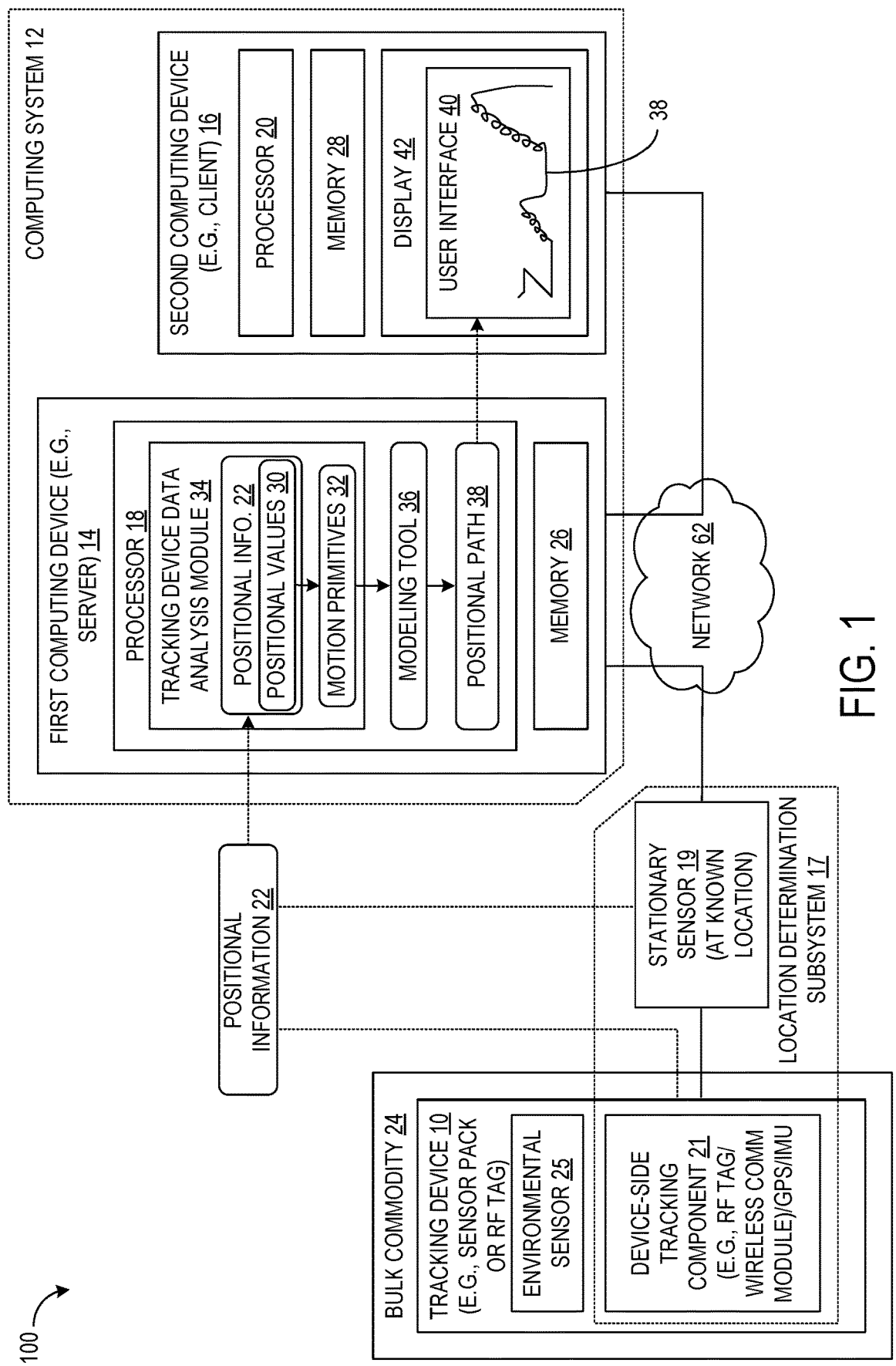
FIG. 1 is a schematic diagram of a traceability system for a bulk commodity supply chain.

To address the above identified issues, a traceability system 100 for a bulk commodity supply chain is provided. Referring initially to FIG. 1, the traceability system 100 includes a tracking device 10 and a computing system 12 that includes at least one computing device. Computing system 12 is illustrated as including a first computing device including a processor 18 and memory 26, and a second computing device 16 including a processor 20 and memory 28. The illustrated implementation is exemplary in nature, and other configurations are possible. In the description below, the first computing device will be described as a server 14 and the second computing device will be described as a client computing device 16, and respective functions carried out at each device will be described. It will be appreciated that in other configurations, the computing system 12 may include a single computing device that carries out the salient functions of both the server 14 and client computing device 16, and that the first computing device could be a computing device other than server 14. In other alternative configurations, functions described as being carried out at the server 14 may alternatively be carried out at the client computing device 16 and vice versa.

Continuing with FIG. 1, the tracking device 10 is configured to be placed in a bulk commodity 24 traveling along a bulk commodity supply chain, as explained in more detail below. The bulk commodity 24 may be an agricultural bulk commodity such as corn, soybeans, wheat, coffee, cacao, tree nuts, for example. Alternatively, the bulk commodity 24 may be a non-agricultural bulk commodity, such as machine parts (e.g., nuts, bolts, washers), scrap for recycling (e.g., metal, plastic, and glass), recycled aggregate, forest products, coal, sand, cement, and rock, for example. Other materials that are measured volumetrically and transported and distributed in bulk may also be traced using the systems and methods described herein. An environmental sensor 25 configured to track and record environmental conditions, such as temperature and/or humidity, for example, may be included in the tracking device 10. Data from the environmental sensor 25 may be used to determine if the environmental sensor 25, and thus the bulk commodity 24, was exposed to any unfavorable environmental conditions that would compromise the integrity of the bulk commodity 24 as traveled along the supply chain.

The tracking device 10 is designed to be conveyed along with the bulk commodity 24 through material handling devices throughout the supply chain. Each material handling device imparts a characteristic motion to the tracking device during transport, which can be tracked as described herein using various sensors equipped to detect such motions. To this end, the traceability system 100 further comprises a location determination subsystem 17 configured to determine positional information 22 of the tracking device 10 while the tracking device 10 is traveling along the bulk commodity supply chain. As shown in FIG. 1, the location determination subsystem 17 includes one or a plurality of stationary sensors 19 positioned at predetermined locations external to the tracking device 10 along the supply chain and configured to detect a position of a device-side tracking component 21 of the tracking device 10 to thereby determine the positional information 22. Specific examples of stationary sensors 19 and device-side tracking components 21 are described below in references to the examples of FIGS. 2 and 3.

The server 14 has at least one processor 18, which is configured to execute a tracking device data analysis module 34. The tracking device data analysis module of the processor 18 is configured to receive the positional information 22 from the location determination subsystem 17 and extract positional values 30 from the positional information 22. The processor 18 processes the positional values 30 to identify motion primitives 32, and applies a modeling tool 36 to the identified motion primitives 32 to produce a positional path 38 of the tracking device 10. The positional path 38 is outputted, for example, by being transmitted to the second computing device 16 via a computer network 62 and being displayed via a user interface 40 on a display 42 of the second computing device 16 or being transmitted to a storage location such as memory 26 or memory 28, or to a downstream program for further processing. Alternatively, the positional path may be displayed on a display associated with the first computing device. It will be appreciated that the positional path 38 represents travel of the bulk commodity 24 along the bulk commodity supply chain, and may be two or three dimensional, as described in more detail below.

Figure 2:
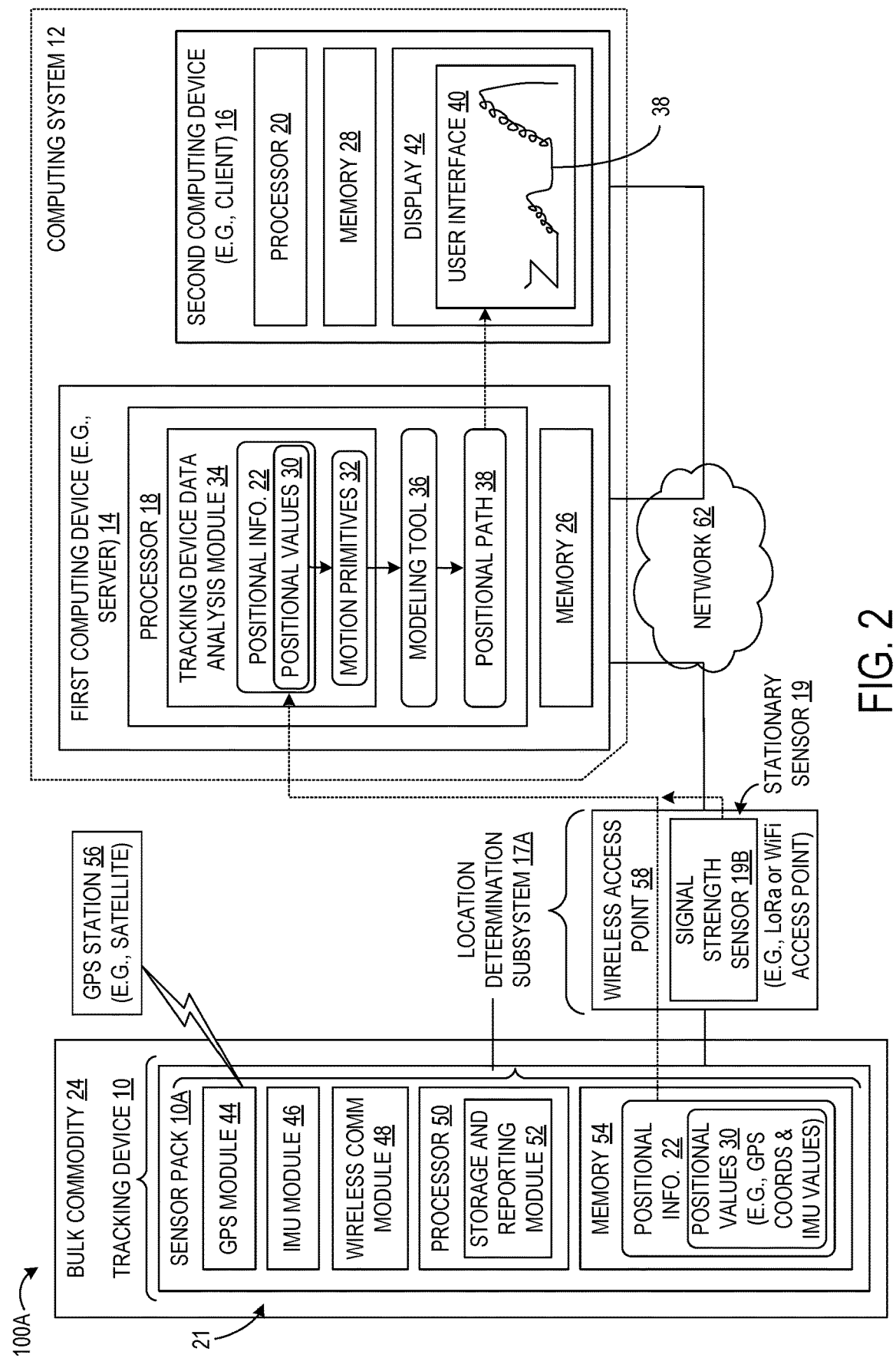
FIG. 2 is a schematic diagram of a specific configuration of the traceability system of FIG. 1.
Figure 3:
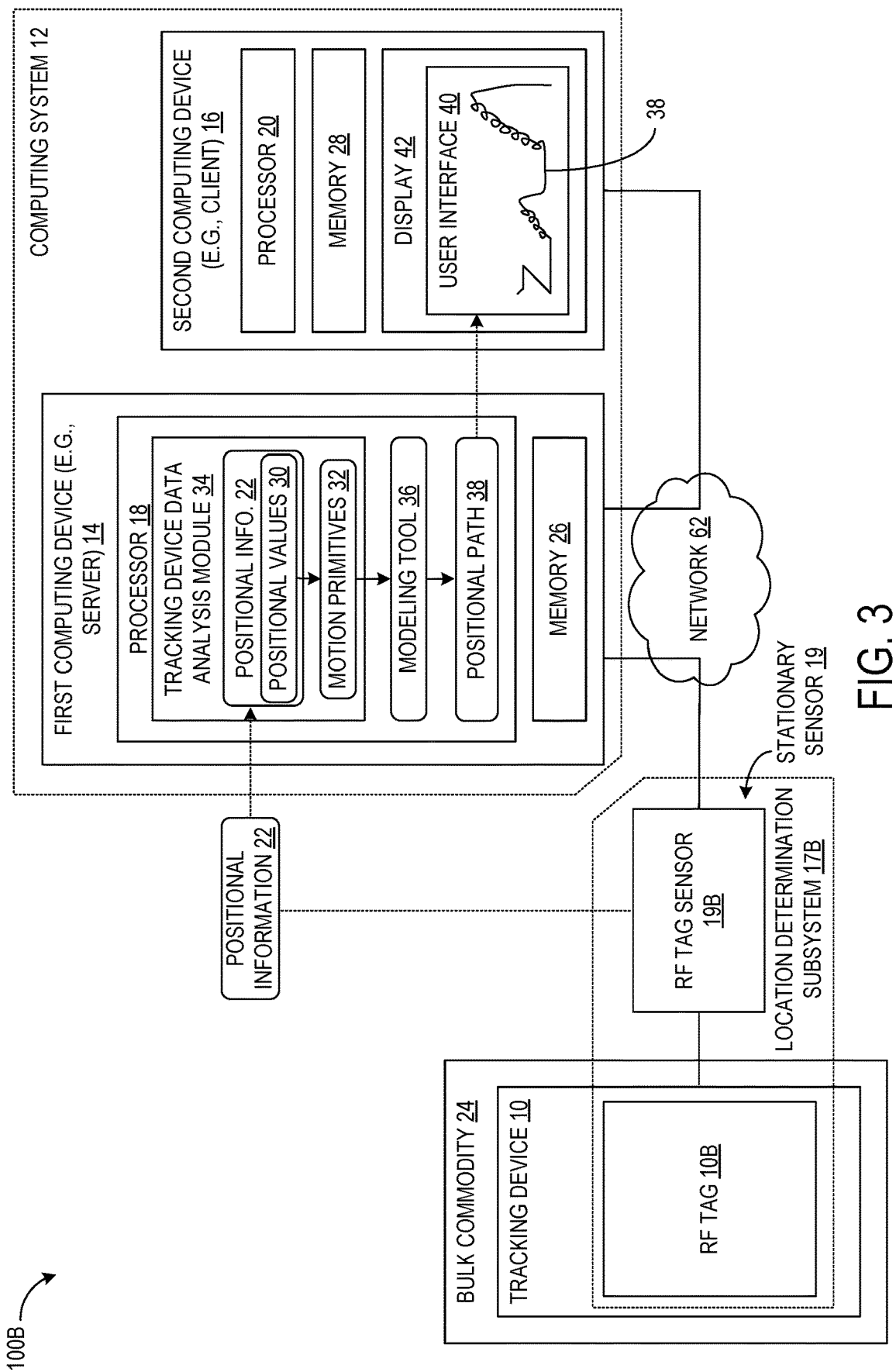
FIG. 3 is a schematic diagram of another specific configuration of the traceability system of FIG. 1.

The tracking device 10 and location determination subsystem 17 may take a variety of configurations. A first configuration is illustrated in FIG. 2, and utilizes wireless access points 58 to determine the position of the tracking device 10, for example, by triangulation of wireless signals from a sensor pack 10A based on signal strength. A second configuration is illustrated in FIG. 3, and utilizes RF tags 10B in the tracking device 10, and RF tag sensors 17A positioned at various locations along the supply chain to detect the position of the RF tag as it travels through the supply chain.

Turning now to FIG. 2, a more specific configuration of the traceability system 100 is illustrated at 100A, which includes a tracking device 10 configured as a sensor pack 10A that includes at least one of a Global Positioning System (GPS) module 44 configured to determine GPS coordinates of the tracking device 10 and an Inertial Measurement Unit (IMU) module 46 configured to track the inertial forces experienced by the sensor pack 10A during motion. In this configuration, the location subsystem 17A includes the GPS module 44 and IMU module 46 as device-side tracking components 21, and at least a portion of the positional information 22 is stored in memory of the tracking device 10, at least temporarily, and is later transmitted to the first computing device 14 after storage. The positional information 22 determined at the sensor pack 10A may be stored in memory 54 by the storage and reporting module 52, and then sent from the sensor pack 10A to the server 14 via a connection over network 62 through wireless access point 58, when a connection between the sensor pack 10A, the wireless access point 58, and the Internet, is available.

Further, in this example, the sensor pack 10A may include a wireless communication module 48 as another device-side tracking component 21 for wireless communications with a plurality of wireless access point 58 positioned at predetermined (i.e., known), stationary locations throughout a region. The wireless communication module 48 and the wireless access points 58 may be configured to communicate according to the WIFI, Long Range WAN (LORAWAN), or Bluetooth Low Energy (BLE) standards, for example. Thus, the wireless communication module 48 may be configured as a LoRa, Wi-Fi, or BLE transceiver, for example. Each wireless access point 58 may be configured with a signal strength sensor 19B, which is the specific type of stationary sensor 19 used in this example. The wireless access points 58 are configured to determine the location of the tracking device 10 based on signal strength of the wireless signal as measured by the signal strength sensors 19B, by estimating a distance from the fixed predetermined location of each wireless access point 58 to the sensor pack 10A and triangulating the location of the sensor pack 10A. The wireless access points 58 may maintain a shared state table containing the signal strength and estimated distance values, as well as an ID (e.g., MAC address) for each sensor pack 10A. Changes in entries to the shared state table may be shared and synced via a peer-to-peer communications among the wireless access points 58. Due to their role in determining location, the wireless access points 58 and wireless communication modules 48 form a portion of the location determination subsystem 17A in this example. The triangulated position of the sensor pack 10A may thus be included in positional information 22. The positional information 22 from the wireless access points 58 may be communicated directly from the wireless access points 58 to the server 14 via computer network 62, as shown schematically in dashed lines. Alternatively, the signal strength sensor 19B may be included in the sensor pack 10A and the triangulation calculation may be performed by the sensor pack 10A and reported from the sensor pack 10A to the server 14. In this alternative configuration, information about the locations of each of the wireless access points 58 is maintained on the sensor pack 10A, for use in the distance calculations.

The positional information 22 obtained at the sensor pack 10A may include positional values 30. The positional values include GPS coordinates and/or values from the IMU 46. Other types of positional values 30 may also be included in positional information 22, such as proximity to a Wi-Fi access point at a known location, proximity to a cell tower with a known location, proximity to a peer device as detected by Bluetooth or near field communications, for example.

The sensor pack 10A includes a processor 50 and associated memory 54. The processor 50 is configured to execute a storage and reporting module 52 to store the positional information 22 from the GPS module 44 and IMU module 46 in memory 54 and transmit positional information 22 to the server 14. In some implementations, tracking and reporting may occur in real time. For example, when both (a) signals from GPS satellites 56 are received at the sensor pack 10A enabling a position determination by the GPS module 44, and (b) a connection to wireless access point 58 is available to transmit positional information 22 including the GPS coordinates of the sensor pack 10A to the server 14 in real time.

Additionally or alternatively, in the event real-time reporting is not available, the sensor pack 10A may be configured to process and store the positional information 22 for later extraction, using a store and forward model. To enable such functionality, the storage and reporting module 52 may be configured to store the position information 22 in memory 54 until the sensor pack 10A is retrieved at the end of the journey through the supply chain, or at intermittent points in the supply chain at which upload opportunities exist by virtue of the availability of network connections to network 62 through one or more of the wireless access points 58.

Server 14 is configured to receive, process, and store the positional information 22 received from the sensor pack 10A and/or wireless access points 58. Processor 18 of server 14 may be configured to execute a tracking device data analysis module 34, which is a program that is configured to extract the positional values 30 from the positional information 22, and process the positional values 30 to thereby identify motion primitives 32 of the sensor pack 10A characteristic of movement as the sensor pack 10A moves along the supply chain. The processor 18 is configured to execute a modeling tool 36. Modeling tool 36 is configured to receive as input motion primitives 32, and process the motion primitives 32 to thereby produce a positional path 38 of the sensor pack 10A as it travels along the bulk commodity supply chain. Further examples of motion primitives are discussed below.

The positional path 38 represents travel of the bulk commodity along the bulk commodity supply chain. The positional path 38 of the sensor pack 10A may be traced, for example, from an origin, such as a point of harvest or collection, of the bulk commodity 24 to a storage or distribution location of the bulk commodity 24.

The positional path 38 is outputted from the server 14, for example, by being transmitted to client computing device 16 and displayed via user interface 40 on a display 42 of the client computing device 16, or by being transmitted to a storage location or downstream program for further processing. The positional path 38 may be three dimensional, which can be particularly useful when computing the estimated position of the tracking device 10 in a volumetric storage container, such as a silo, as discussed below. Alternatively, in some configurations, the positional path 38 may be two dimensional, for example such that only latitude and longitudinal coordinates are modeled. It will be appreciated that the data associated with the tracking device 10, such as an identification of the origin of the bulk commodity 24, growing or fabrication conditions, and the volume harvested or collected, may also be stored along with the positional information 22 of the tracking device 10.

FIG. 3 illustrates another configuration of the traceability system 100B, which utilizes RF tag technology. As shown, tracking device 10 includes a passive radio frequency (RF) tag 10B that is configured to emit a tracking signal when bombarded by radio waves from an interrogating RF tag sensor 19B. The RF tag 10B may be configured as an RFID tag configured to emit a unique tag identifier, for example. The passive RF tag 10B and interrogating RF tag sensor 19B form at least a portion of the location determination subsystem 17B in this example. In a typical installation, multiple RF tag sensors 19B are installed as stationary sensors 19 at predetermined locations throughout the supply chain, and each detects a unique identifier emitted by each of the RF tags 10B as they pass within a proximity of the RF tag sensors 19B. The positional information 22 generated from each detection includes an RF Tag 10B identifier, a time of identification, and a location of identification (i.e., the location of the RF tag sensor). It is possible that multiple RF tag sensors can triangulate a two- or three-dimensional position of the RF tag 10B based on signal strength, as described above for wireless access point triangulation, the output of which can be used to recreate a two- or three-dimensional positional path 38. The remaining components of system 100B have similar functionality to like numbered parts described above, and will not be redescribed for the sake of brevity. It will be appreciated that as an alternative to RF tag being a passive RFID tag, the RF tag may be an RF transmitter configured to emit a beacon signal with an encoded tag identifier, and may be supplied with power from a battery on board the tracking device 10. In this alternative embodiment, the RF tag sensors 19B may be configured to receive the beacon from the RF tag sensor, and triangulate the position of the RF tag, using similar techniques to those described above.

Figure 4A:
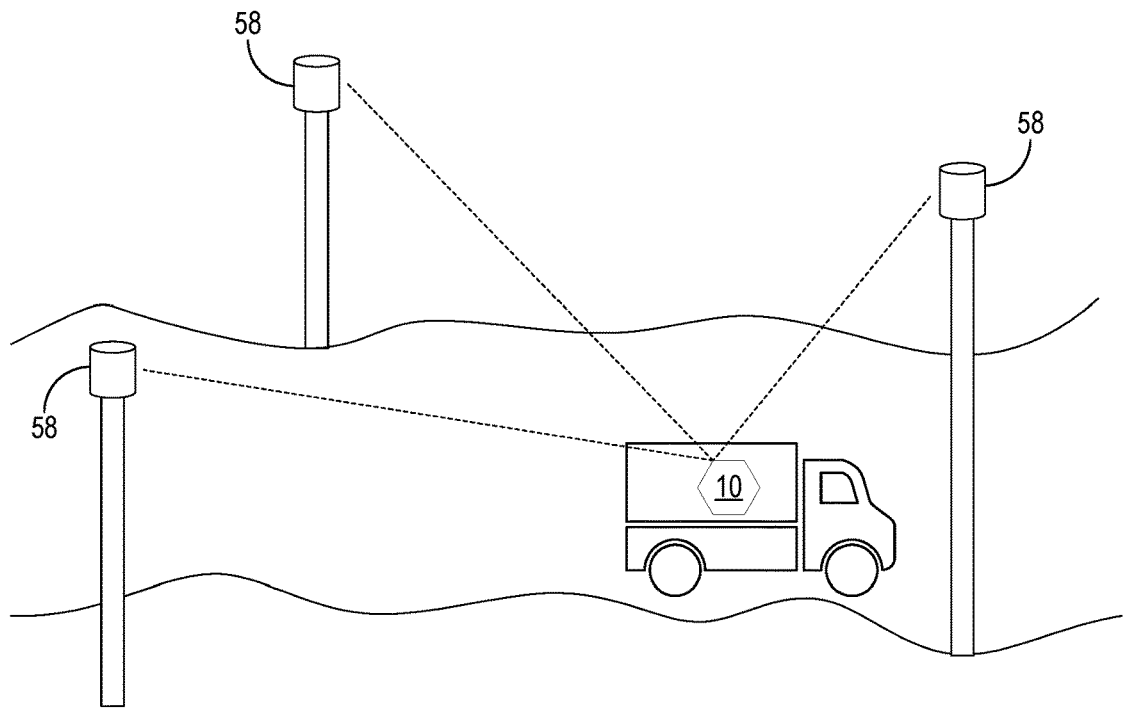
FIGS. 4A and 4B are illustrations of detection of a position of the tracking device of the traceability system of FIG. 1.

As shown in FIG. 4A, the location determination subsystem 17 includes one or a plurality of stationary sensors 19 positioned external to the tracking device 10 and configured to detect a position of the tracking device 10 to thereby determine the positional information 22. The stationary sensors 19 may be wireless access points 58 of the types described above, RF tag sensors 19B, or other location sensing sensors. The wireless access points 58 or RF tag sensors 19B may be mounted on fences, poles, or the like at predetermined locations in an agricultural setting, as some examples. It will be appreciated that LoRa installations may be particularly useful in such settings. The long range and low energy consumption of LoRa networks enables tracking of the tracking device 10 in remote settings, such as farms that are too large and remote to be covered by a Wi-Fi network installation for example. As a position and height of each wireless access point 58 is known, the tracking device 10 can be detected, and its position triangulated as it moves through a region between stationary wireless access points 58.

Figure 4B:
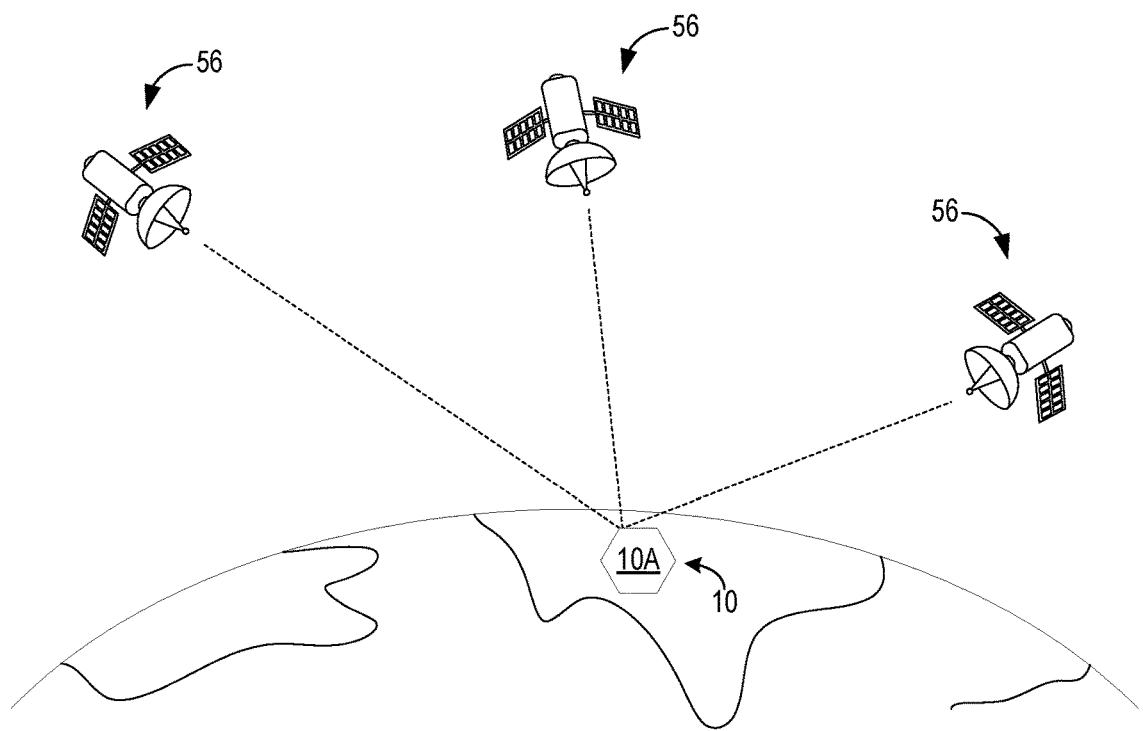

As shown in FIG. 4B, the GPS module 44 enables a position of the tracking device 10 configured as a sensor pack 10A to be detected at the GPS module 44 of each sensor pack 10A, by virtue of receiving GPS signals from GPS stations 56, such as GPS satellites, when the sensor pack 10A is exposed to the sky and satellite signal reception is possible.

The IMU module 46 may include a 3-axis gyroscope, a 3-axis accelerometer, and a 3-axis magnetometer, thereby enabling movement of the tracking device 10 to be tracked in 9 degrees of freedom (9DoF) such that acceleration, angular displacement, and magnetic orientation can be determined. Other configurations of IMU module 46, such as 6DoF, are also possible. With the IMU module 46, the 6DoF, 9DoF or other format of IMU values can be output as positional values 30. These values characterize the motion of the tracking device 10 during transit, and can be processed to identify motion primitives 32, which aid in reconstructing the positional path 38 of the tracking device through dead reckoning and other techniques, when GPS signals are not available, for example. Motion primitives 32 will be described in more detail below.

Figure 5:
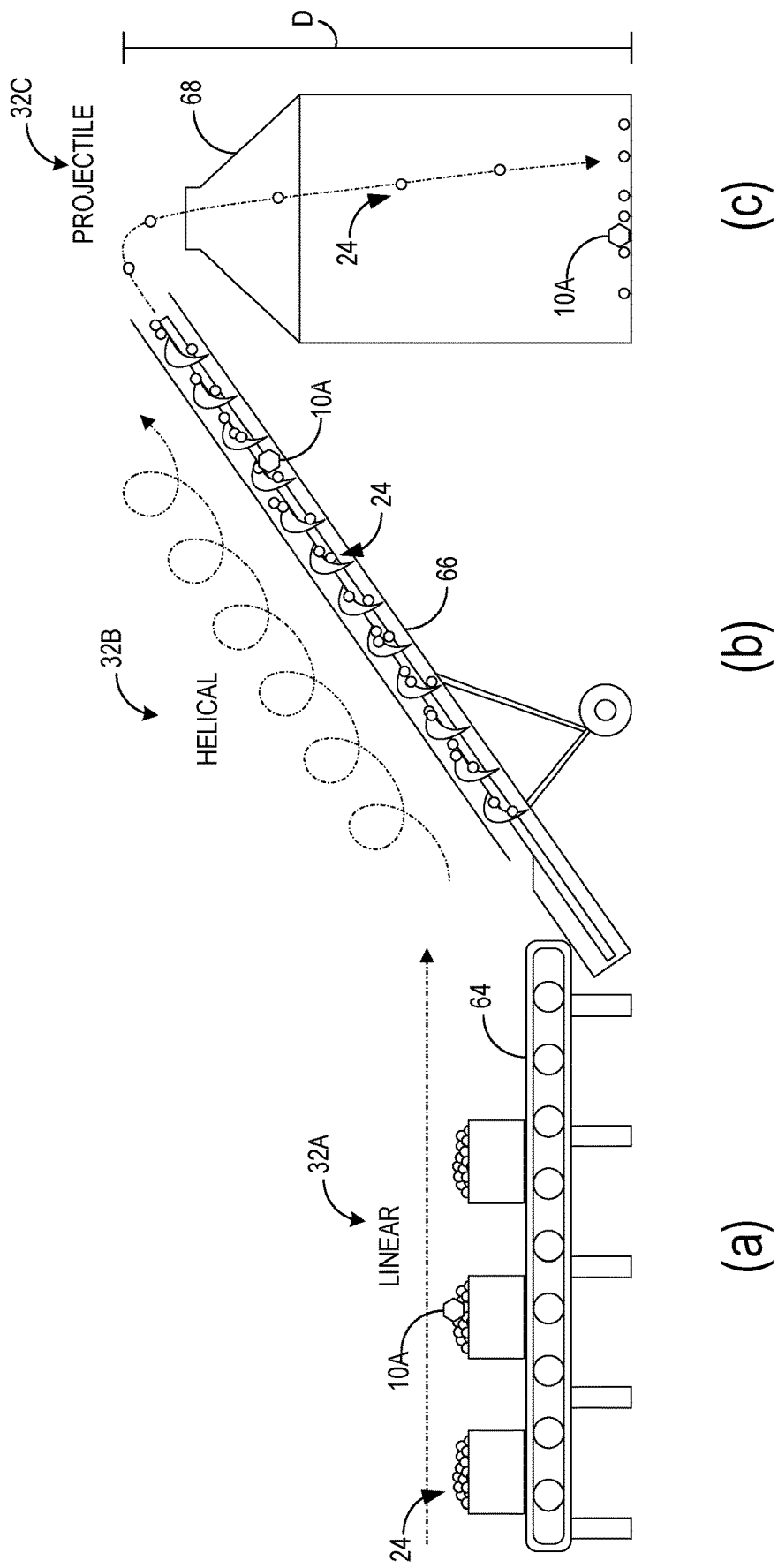
FIG. 5 shows example illustrations of motion primitives of the traceability system of FIG. 1.

FIG. 5 illustrates sensor packs 10A traveling in a bulk commodity 24 through a portion of a supply chain. To ensure that the sensor pack 10A is of a size that moves along with the bulk commodity 24 as it is conveyed without damage to the sensor pack 10A or to any farm or other equipment used along the bulk commodity supply chain, a size of the sensor pack 10A may be within a range of 1 cubic centimeter to 5 cubic centimeters, such that it is similar in size to a single unit of the respective bulk commodity 24, or such that it remains entrained within the bulk commodity 24 and passes through the material handling devices along the supply chain with ease. In some configurations, an external surface of the sensor pack 10A is formed in a spherical, semi-spherical, or polygonal shape, to promote sure passage through the material handling devices. RF tag 10B may have similar dimensions.

FIG. 5 at (a)-(c) illustrates in dot-dash lines three motion primitives associated with movement of the bulk commodity 24, as tracked with sensor packs 10A (or alternatively RF tags 10B). At (a) in FIG. 5, a linear motion primitive 32A is shown. Linear motion primitive 32A of the sensor pack 10A, and thus the bulk commodity 24 into which it is inserted, may be observed as it travels on conveyors, trucks, wagons, or the like that move linearly. The linear motion primitive 32(a) is characterized by 6DoF or 9DoF IMU values that indicate linear motion, for example. In the example shown at (a) in FIG. 5, the bulk commodity 24 is traveling on a conveyor 64. It will be appreciated that linear motion may be along any direction, such as moving along a road (X-direction) or being hoisted in buckets (Z-direction), and may be in carriage mechanism that travels linearly.

At (b) in FIG. 5, a helical motion primitive 32B is shown. The sensor pack 10A and bulk commodity 24 within which it travels may experience helical motion due to the use of augers, screw conveyors, or the like that are used to move the bulk commodity 24, thereby imparting a signature motion pattern reflected in the IMU values captured during such motion. In the example shown at (b) in FIG. 5, the helical motion of the bulk commodity 24 is caused by an auger 66.

At (c) in FIG. 5, a projectile motion primitive 32C is shown. Bulk commodities 24 are often expelled from manifolds as they are transferred from combine to wagons, wagons to trucks, trucks to silos, and the like. The expulsion of the bulk commodity 24 in this manner may be detected by characteristic changes in the IMU values, representing the projectile motion primitive 32C. In the example shown at (c) in FIG. 5, the bulk commodity 24 experiences projectile motion 32C as it leaves the helical motion 32B of the auger 66 and enters a silo 68. Knowing the predetermined volume of the bulk commodity 24 at its point of origin, a height and a circumference of the silo 68, and a distance D the bulk commodity 24 travels from expulsion into the silo 68 via acceleration of the IMU module 46, the position of the bulk commodity 24 in the silo 68 can be determined. This can enable tracking of the tracking device as the silo is slow emptied from the bottom as loads of material are placed in trucks or train cars for distribution. While a silo is used as in the example shown at (c) in FIG. 3, it will be appreciated that the position of the bulk commodity 24 may be determined in other types of storage container having known dimensions.

FIG. 5 illustrates specific examples of three motion primitives, which are meant to be illustrative not exhaustive. It will be appreciated that other bulk commodity material handling devices such as vibrating conveyors, conveyor belts, screening equipment, etc. would produce different material primitives, and the tracking device data analysis module 34 can be configured to recognize motion primitives associated with such handling devices and reproduce positional path 38 appropriately. Once the motion primitives 32 are identified, they can be used by modeling tool 36 to reproduce positional path 38.

In some implementations, there may be more than one silo or storage container, and a sorting device 69 may direct the bulk commodity 24 to travel along one of a plurality of different supply paths, based upon information from the tracking device 10. For example, the sorting device 69 may direct the bulk commodity 24 to travel along a supply path that leads to a specific silo or storage container based on its origin, destination, and/or characteristics, which may be determined from the positional path 38 of the bulk commodity 24 and/or other sensor information received from the tracking device 10. This configuration enables bulk commodities 24 from different harvest points to be directed to different silos or storage containers. It also enables bulk commodities to be sorted to be stored with like bulk commodities, and/or bulk commodities to be sorted on the basis of certain attributes, such as owner, farm of origin, age of the bulk commodity at the time of harvest, quality of the bulk commodity, destination, and the like. In another use-case scenario, a contaminated bulk commodity may be, for example, routed out of the supply chain to a sequestering facility. Additionally or alternatively, the sorting device 69 may be used to direct a bulk commodity grown under specific conditions, such as organically, to travel an appropriate supply path in the supply chain dedicated to bulk commodities grown under the same specific conditions.

Figure 6:
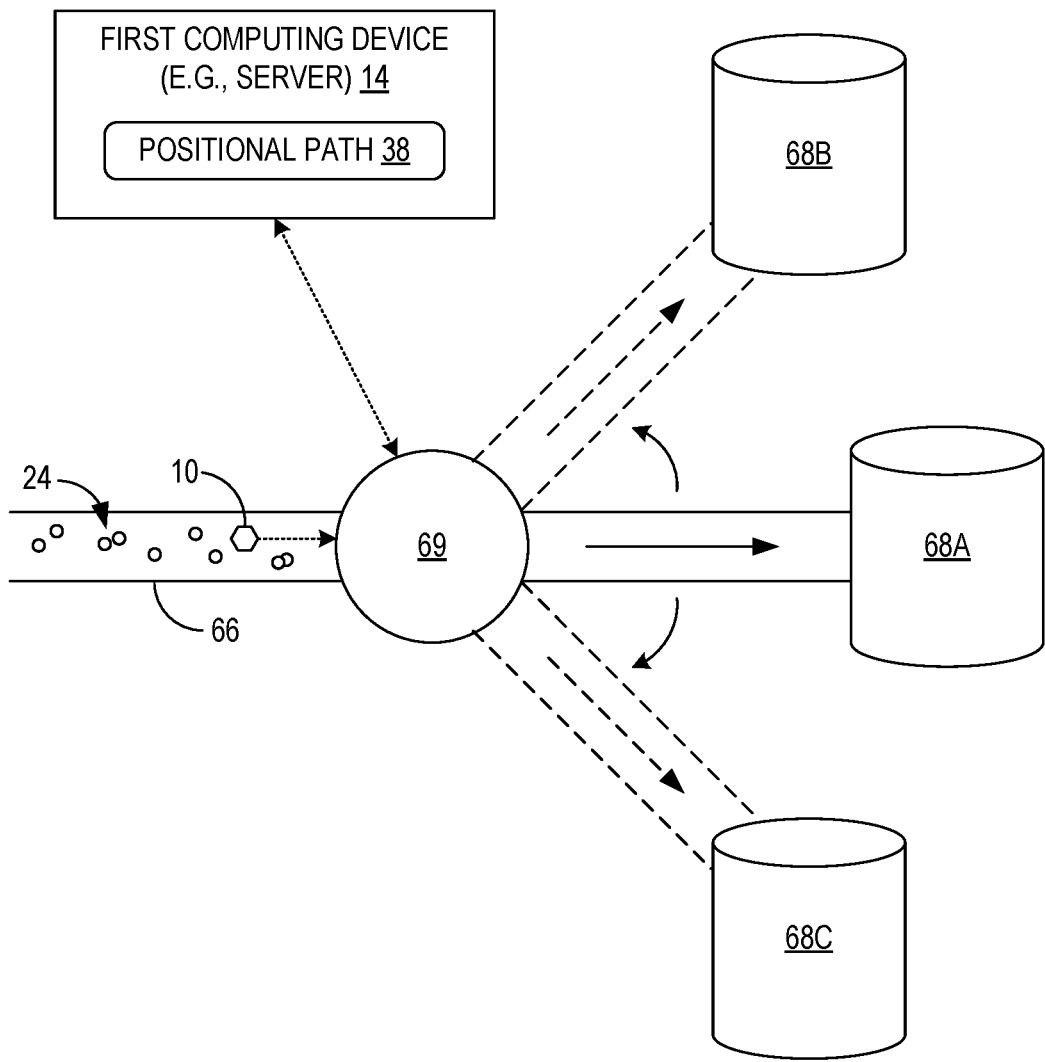
FIG. 6 is an illustration of a sorting device that directs a bulk commodity along the supply chain in accordance with the traceability system of FIG. 1.

In the example shown in FIG. 6, the sorting device 69 may be arranged at a position in the supply chain, such as in the auger 66. The sorting device 69 may be in communication with one or both of the server 14 and the tracking device 10. As such, it may obtain the positional path 38 of the bulk commodity 24 from data stored in the tracking device 10 or by sending a request to the server 14 with an identification of the tracking device 10. When the tracking device 10 reaches the sorting device 69, the sorting device 69 may be configured to direct the bulk commodity 24 along a supply path to a particular destination based on the positional path 38 of the bulk commodity 24 along the supply chain thus far. The sorting device 69 may be set to default to one silo or storage container, such as silo 68A shown in FIG. 6. However, if the positional path 38 of the bulk commodity 24 indicates that the bulk commodity 24 should be directed to a different silo or storage facility, the sorting device 69 may change the path of the bulk commodity 24 such that it is directed to silo 68B or 68C, for example. In addition to guiding a portion of the bulk commodity 24 to a one of a plurality of different destination storage facilities, the sorting device 69 may be configured to guide the portion of the bulk commodity to different handling equipment (e.g., conveyor, auger, etc.) based upon at least a portion of the data in the positional path 38 received from the tracking device 10 or server 14 for the tracking device 10 entrained in the portion of the bulk commodity 24 passing through the sorting device 69. In this way, the bulk commodity 24 may be routed based upon the positional path 38 that the bulk commodity 24 has traveled to that point in the supply chain. This may offer even greater flexibility to control the flow of bulk commodities 24. For example, a recall on certain commodities could be carried out while the bulk commodities are passing through sorting device 69, or changes in price or customer requirements for the origin of the bulk commodities, could be addressed mid-stream in the process. Further, bulk commodities from different originals that were mixed intentionally can be roughly separated through such sorting if it later turns out that the mixture was undesirable.

Sensor-based tracking can give rise to errors in measurement that may compound over time and cause significant drift from true positional values when applying dead reckoning and other techniques to reproduce positional path 38 based on the motion primitives 32. With the inclusion of the GPS module 44 and the IMU module 46 in the sensor pack 10A of the traceability system 100 described herein, errors in the positional values can be corrected by the tracking device data analysis module 34 via sensor fusion with a Kalman Filter model, such as the Extended Kalman Filter (EKF) model. The EKF model may be applied to manage outlying values, reduce errors, and handle non-linearities of the sensor fusion between the at least one GPS module 44 and the at least one IMU module 46.

The traceability system examples 100, 100A, 100B described herein enable tracking of bulk commodities that are dry materials and can be measured volumetrically. Using the sensor-based approach for traceability provides granularity as well as generalizability. Examples of bulk commodities may include agricultural products such as corn, soy, wheat, coffee, cacao, tree nuts, for example. Should contamination of a point along the supply chain be discovered at a certain point in time, the positional paths 38 of tracking devices intersecting the point of contamination can be ascertained, and the bulk commodities that may be contaminated can be tracked to their current locations in storage or distribution facilities. In this manner, contaminated product may be disposed of in a pinpoint manner affecting only the bulk product that was actually exposed to the contamination, resulting in less waste. Another application of the technical platform described herein is the verification of bulk commodities as pesticide free, organic, or other designation. A potential purchaser of the bulk commodities may examine the positional paths and verify that they originated from an agricultural zone managed according to the desired practices, such as pesticide free growth zone, etc. In addition to agricultural bulk materials, the systems and methods described above also have application to non-agricultural bulk commodities. The systems and methods can be applied to reduce waste in situations such as when a quality control issue is discovered, for example, by pinpointing the location of the bulk commodity in the supply chain that has been affected by the quality issue. An example of zone of origin identification and tracking of a product through its supply chain follows. Although described in the agricultural context, it will be appreciated this example has application to the production of non-agricultural bulk commodities as well.

Figure 7:
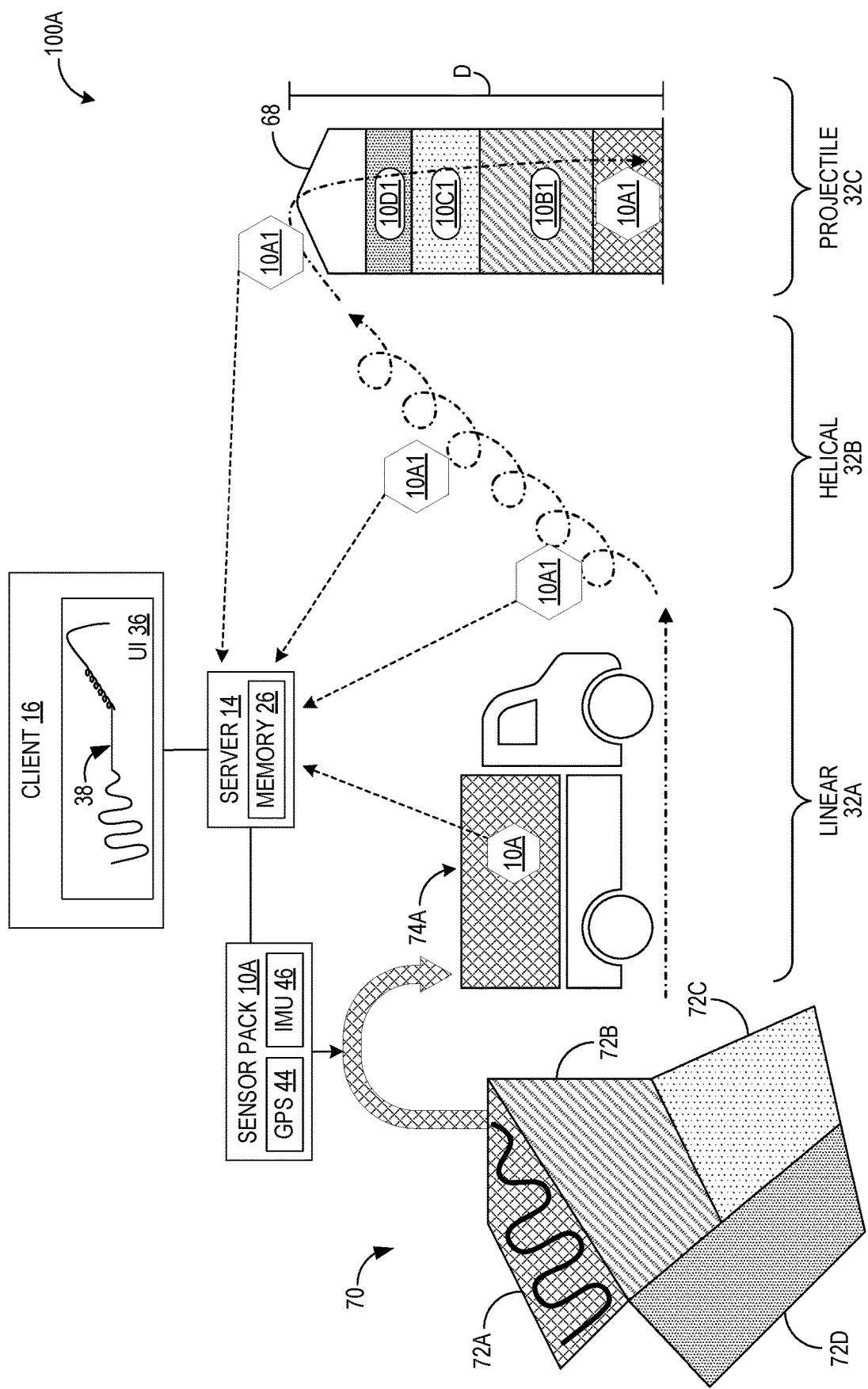
FIG. 7 is an illustration of an example scenario in which the traceability system of FIG. 1 is implemented in an agricultural supply chain.

Turning to FIG. 7, an example scenario in which traceability system 100A is implemented in an agricultural supply chain is shown. In the example shown in FIG. 7, an agricultural management zone 70 is divided into four crops 72A, 72B, 72C, 72D. The sensor pack 10A associated with crop 72A may be placed within a predetermined crop volume 74A of the crop 72A at a point of harvest to transmit positional information to the server 14 via wireless signals, as indicated by the dashed lines in FIG. 4. As described in detail above, the client computing device 16 may receive the positional information 22 from the server 14 to track a position of the crop volume 74A via the sensor pack 10A as it moves along the supply chain. Also as described above, as it moves along the supply chain, the positional information 22 of the sensor pack 10A is recorded and later processed to determine different motion primitive experienced by the crop volume 74A, as indicated by the dash-dot line in FIG. 4. The positional path 38 calculated based on the motion primitives is displayed in user interface 40 of client computing device 16.

Many harvested crops, especially grains, are stored in silos until they are distributed to buyers for packaging and sale. Often, multiple crops are stored in the same silo, which can present a challenge in determining the positions of individual crop volumes. As shown in the agricultural management zone 70 and the silo 68 of FIG. 7, sensor packs 10A1, 10A2, 10A3, and 10A4 can be placed with known volume of respective crops 72A, 72B, 72C, and 72D to track the positions of each crop volume along the supply chain, as well as in storage. It will be appreciated that the agricultural management zone 70 may be one of a plurality of agricultural management zones, each of which have at least one respective crop. Respective sensor packs 10A1-10A4 may be placed within a predetermined crop volume of each respective crop at a point of harvest, such that a positional path of each respective crop can be mapped by the modeling tool 36 executed by the computing device via tracking of respective sensor packs. Similarly, RF tags 10B may be used in this example as an alternative to sensor packs 10A.

Figure 8:
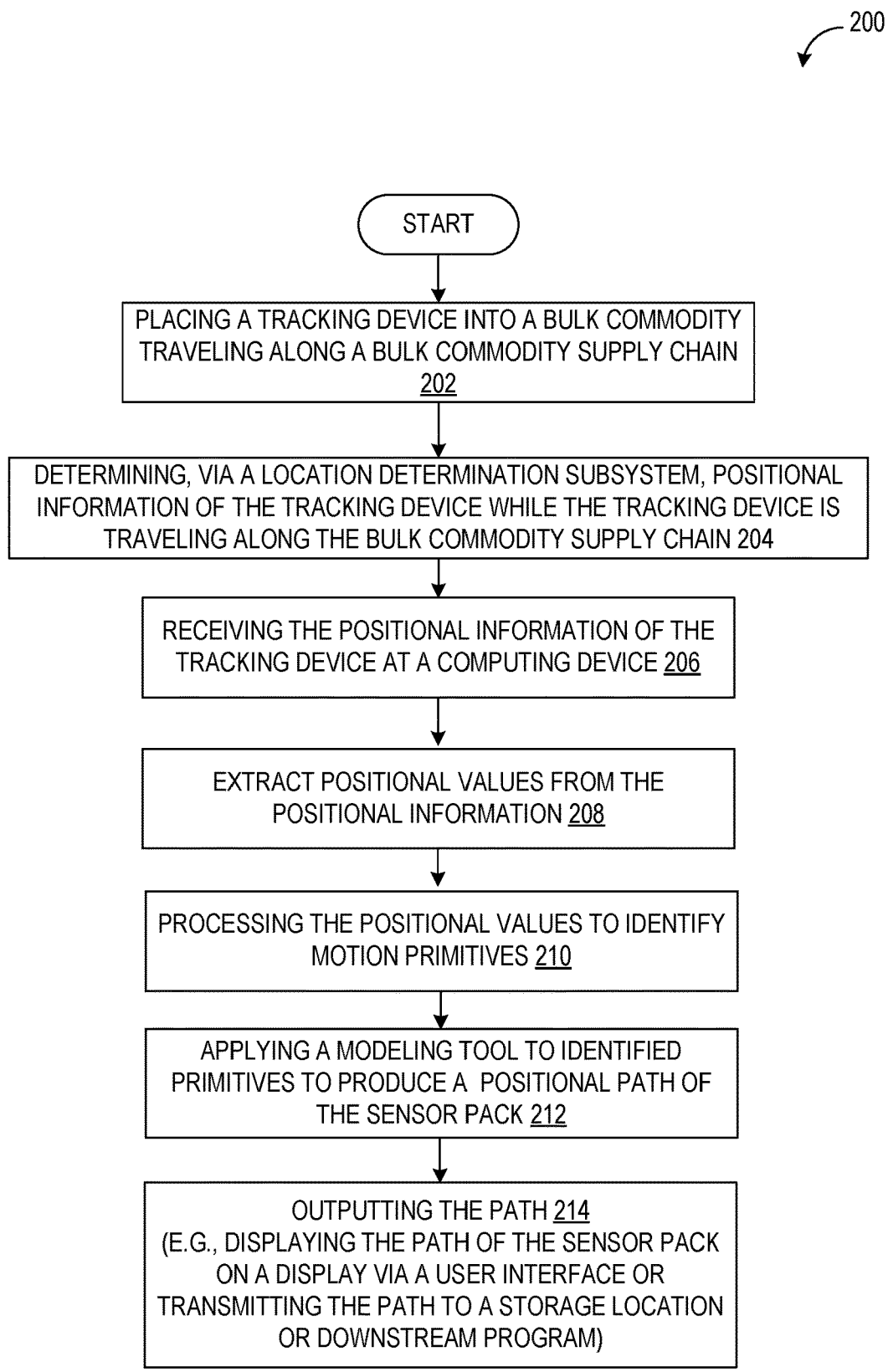
FIG. 8 is a flowchart of a method for tracing a bulk commodity through a supply chain according one example configuration of the present disclosure.

FIG. 8 is a flowchart of a method 200 for tracing a bulk commodity through a supply chain according one example configuration of the present disclosure. At step 202, the method 200 may include placing a tracking device in the bulk commodity traveling along the bulk commodity supply chain. The placement of the tracking device may occur at a known location of a harvest or collection of the bulk commodity, and may be into a predetermined known volume of the bulk commodity.

Continuing from step 202 to step 204, the method 200 may include a determining, via a location determination subsystem, positional information of the tracking device while the tracking device is traveling along the bulk commodity supply chain. In one example, the tracking device may be a sensor pack that includes at least one GPS module, at least one IMU module, and a wireless communication module. The GPS module is configured to determine its position based on signals received from GPS satellites. The IMU module may include a 3-axis gyroscope, a 3-axis accelerometer, and a 3-axis magnetometer, thereby enabling movement of the sensor pack to be tracked in 9 degrees of freedom, or may be of another configuration, as desired. The location determination subsystem may include a wireless communication module that is detected by stationary sensors, such as wireless access points. Alternatively, the location determination subsystem may include an RF tag sensor that detects the position of RF tags, as described above. Further, as described above, the positional information may be collected and stored in the sensor pack for later extraction. Additionally or alternatively, the positional information may be transmitted to and stored on a server, client computing device, or other computing device for later analysis.

Advancing from step 204 to step 206, the method 200 may include receiving at a computing device such as a server, from the location determination subsystem, positional information indicating motion of the tracking device while placed in a bulk commodity traveling along the bulk commodity supply chain.

Continuing from step 206 to step 208, the method 200 may include, extracting positional values from the positional information, at the computing device. At 210, the method may include processing the positional values of the tracking device to identify motion primitives, at the computing device. The IMU values output by the IMU module, GPS coordinates, and position information gleaned from the wireless access points and/or RF tag sensors may be analyzed to identify motion primitives that characterize different types of motion the tracking device undergoes in the supply chain, such as linear, helical, and projectile motion primitives.

Proceeding from step 210 to step 212, the method 200 may include, applying a modeling tool to the identified motion primitives to produce a positional path of the tracking device. Advancing from step 212 to step 214, the method 200 may include, outputting the positional path of the tracking device. This may be accomplished by displaying the positional path on a display via a user interface of a client computing device, or by transmitting the positional path to a storage location or downstream program for further processing, for example.

The quality, grade, and use of agricultural products are determined by the areas of origin, growing processes, harvesting based on agricultural management zones, and transportation and storage of the harvested crop. For example, crops that are sprayed with herbicides and/or grown in the presence of chemical fertilizers may be distributed and priced differently than crops that are not sprayed with herbicides, grown without specific fertilizers, and/or grown on non-till soil for carbon benefits. Such information is useful to the farmers and agricultural organizations, as well the buyers down the supply chain, especially for grains that are aggregated in large silos after being harvested in large volumes across different management zones. The traceability systems 100, 100A, and 100B and method 200 described herein provide mechanisms for tracking crops as they move along the supply chain from harvest to storage, in an automated manner, with reasonable accuracy. This system enables retention of traceability information for harvested crops throughout the supply chain, which permits optimization of supply chain metrics such as pricing and demand forecasting, and improves the future of food security. It also enables consumers and other purchasers of the products to verify the source of the bulk commodities with greater confidence. The automated system of the present disclosure utilizes compact sensor packs that are low power, yet capable of retaining position information that can be decoded into motion primitives to reconstruct the positional journey of the sensor back, and hence the bulk commodity, through the supply chain, in a manner heretofore not achieved. Tracking devices in the form of RF tags provide an even lower power and compact solution, with the tags requiring no battery as they harvest power from being bombarded with RF energy. Such a technical solution is low cost, scalable, and provides position information with sufficient accuracy to meet the needs of supply chain traceability.

In some embodiments, the methods and processes described herein may be tied to a computing system of one or more computing devices. In particular, such methods and processes may be implemented as a computer application program or service, an application-programming interface (API), a library, and/or other computer program product.

Figure 9:
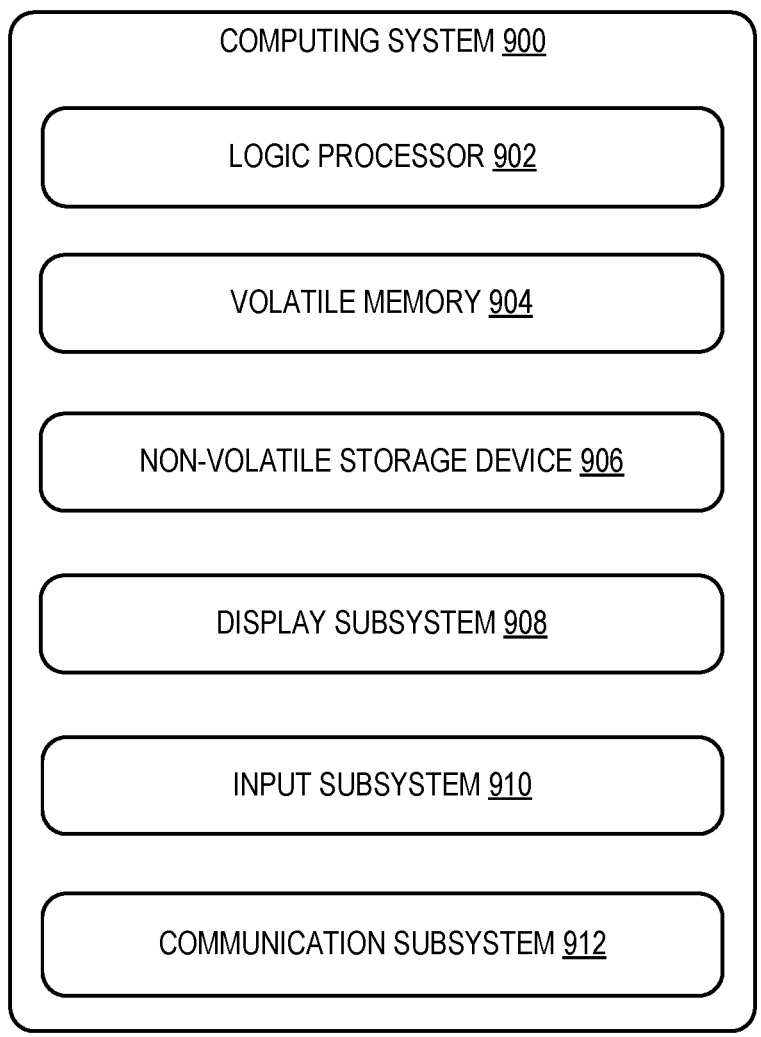
FIG. 9 is an example computing system according to one implementation of the present disclosure.

FIG. 9 schematically shows a non-limiting embodiment of a computing system 900 that can enact one or more of the methods and processes described above. Computing system 900 is shown in simplified form. Computing system 900 may embody the computing devices 14 and/or 16 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional description of aspects of the present disclosure. One aspect provides a traceability system for a bulk commodity supply chain. The traceability system may comprise a tracking device, a location determination subsystem, and at least one computing device having at least one processor. The tracking device may be configured to be placed in a bulk commodity traveling along the bulk commodity supply chain. The location determination subsystem may be configured to determine positional information of the tracking device while the tracking device is traveling along the bulk commodity supply chain. The at least one processor may be configured to execute instructions using portions of associated memory to receive the positional information from the location determination subsystem, extract positional values from the positional information, and process the positional values of the tracking device to identify motion primitives. A modeling tool may be applied to the to the identified motion primitives to produce a positional path of the tracking device. The at least one processor may be configured to output the positional path, which represents travel of the bulk commodity along the bulk commodity supply chain.

In this aspect, additionally or alternatively, the tracking device may be a sensor pack that includes at least one of a Global Positioning System (GPS) module and an Inertial Measurement Unit (IMU) module. The GPS module may be configured to determine GPS coordinates of the tracking device, and the IMU module may be configured to determine IMU values of the tracking device. The GPS coordinates and/or IMU values may be included in the positional information. The GPS module and IMU module may form at least a portion of the location determination subsystem. The positional information may be stored in memory of the tracking device and transmitted to the computing device.

In this aspect, additionally or alternatively, the tracking device may include a passive radio frequency (RF) tag that is configured to emit a tracking signal when bombarded by radio waves from an interrogating RF tag sensor. The passive radio frequency tag and interrogating RF tag sensor may form at least a portion of the location determination subsystem.

In this aspect, additionally or alternatively, the location determination subsystem may include one or a plurality of stationary sensors positioned external to the tracking device. The stationary sensors may be configured to detect a position of the tracking device to thereby determine the positional information. The stationary sensors may be selected from the group comprising wireless access points and RF tag sensors.

In this aspect, additionally or alternatively, the motion primitives may include at least one of linear motion, helical motion, and projectile motion.

In this aspect, additionally or alternatively, the bulk commodity may be a crop from an agricultural management zone. The tracking device may be placed within a predetermined crop volume of the crop at a point of harvest, and the computing device may map a positional path of the crop volume of the crop via the tracking device as it moves through the supply chain.

In this aspect, additionally or alternatively, the tracking device may be one of a plurality of tracking devices, and the agricultural management zone may be one of a plurality of agricultural management zones. Each agricultural management zone of the plurality of agricultural management zones may have at least one respective crop. At least one tracking device of the plurality of tracking device may be placed within a predetermined crop volume of each respective crop at a point of harvest, such that a positional path of each respective crop may be mapped by the computing device via a respective tracking device.

In this aspect, additionally or alternatively, the tracking device may include an environmental sensor configured to track and record environmental conditions. In this aspect, additionally or alternatively, the bulk commodity may be an agricultural bulk commodity or non-agricultural bulk commodity. The agricultural bulk commodity may be selected from the group consisting of corn, soy, wheat, coffee, and cacao. The non-agricultural bulk commodity may be selected from the group consisting of bulk machine parts, scrap for recycling, recycled aggregate, forest products, rock, cement, sand, and coal.

In this aspect, additionally or alternatively, a size of the tracking device is in a range of 1 cubic centimeter to 5 cubic centimeters.

Another aspect provides a method for tracing a bulk commodity through a supply chain. The method may comprise receiving, from a location determination subsystem, positional information of a tracking device while placed in a bulk commodity traveling along the bulk commodity supply chain, extracting positional values from the positional information, and processing the positional values of the tracking device to identify motion primitives. The method may further comprise applying a modeling tool to the identified motion primitives to produce a positional path of the tracking device, and outputting the positional path. The positional path may represent travel of the bulk commodity along the bulk commodity supply chain.

In this aspect, additionally or alternatively, the location determination subsystem may include a Global Positioning System (GPS) module of the tracking device, an Inertial Measurement Unit (IMU) module of the tracking device, and/or a wireless communication module of the tracking device and wireless access points external to the tracking device that are configured to perform wireless triangulation based on signal strength.

In this aspect, additionally or alternatively, the method may further comprise correcting errors in the positional values of positional information from the GPS module, IMU module, and/or wireless triangulation via sensor fusion with an Extended Kalman Filter model.

In this aspect, additionally or alternatively, the location subsystem may include a passive radio frequency (RF) tag of the tracking device and RF tag sensor external to the RF tag.

In this aspect, additionally or alternatively, the motion primitives may include at least one of linear motion, helical motion, and projectile motion.

In this aspect, additionally or alternatively, the bulk commodity may be a crop from an agricultural management zone. The method may further comprise placing the tracking device within a predetermined crop volume of the crop at a point of harvest, and mapping, by the computing device, a positional path of the crop volume of the crop via the tracking device as it moves through the supply chain.

In this aspect, additionally or alternatively, the tracking device may be one of a plurality of tracking devices, and the agricultural management zone may be one of a plurality of agricultural management zones. Each agricultural management zone of the plurality of agricultural management zones may have at least one respective crop. At least one tracking device of the plurality of tracking device may be placed within a predetermined crop volume of each respective crop at a point of harvest, such that a positional path of each respective crop may be mapped by the computing device via a respective tracking device.

In this aspect, additionally or alternatively, the method may further comprise selecting the bulk commodity as an agricultural bulk commodity or a non-agricultural bulk commodity. The agricultural bulk commodity may be selected from the group consisting of corn, soy, wheat, coffee, and cacao. The non-agricultural bulk commodity may be selected from the group consisting of bulk machine parts, scrap for recycling, recycled aggregate, forest products, rock, cement, sand, and coal.

In this aspect, additionally or alternatively, the method may further comprise directing, via a sorting device, the bulk commodity to travel along one of a plurality of different supply paths, based upon information from the tracking device.

Another aspect provides a traceability system for an agricultural supply chain. The traceability system may comprise a plurality of sensor packs and a computing system. Each sensor pack of the plurality of sensor packs may include at least one Global Positioning System (GPS) module and at least one Inertial Measurement Unit (IMU) module. Each sensor pack of the plurality of sensor packs may be configured to transmit a signal indicating positional information of the respective sensor pack. The computing system may include at least one processor configured to execute instructions using portions of associated memory to receive and store the positional information from each sensor pack of the plurality of sensor packs, extract positional values from the positional information of each sensor pack, and process the positional values of each sensor pack of the plurality of sensor packs to identify motion primitives. The processor may be further configured to apply a modeling tool to the identified motion primitives to produce a positional path for each sensor pack of the plurality of sensor packs, and output the positional path of each sensor pack. The positional path may be output by transmitting data representing the positional path to a storage location or downstream program for further processing, or displaying the positional path via a user interface on a display. The agricultural supply chain may include commodities from a plurality of agricultural management zones, and each agricultural management zone of the plurality of agricultural management zones may have at least one respective crop. At least one sensor pack of the plurality of sensor packs may be placed within a predetermined crop volume of each respective crop at a point of harvest. The positional path of the at least one sensor pack may represent travel of the predetermined crop volume of each respective crop along the agricultural supply chain from the point of harvest to a point of storage or distribution.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A traceability system for an agricultural bulk commodity supply chain, the traceability system comprising:
a tracking device configured to be placed in an agricultural bulk commodity traveling along the agricultural bulk commodity supply chain, the tracking device being similar in size to a single unit of the agricultural bulk commodity such that it remains entrained within the agricultural bulk commodity and is conveyed along with the agricultural bulk commodity through material handling devices throughout the agricultural bulk commodity supply chain, the material handling devices imparting respective characteristic motions on the tracking device;
a location determination subsystem configured to determine positional information of the tracking device while the tracking device is traveling along the agricultural bulk commodity supply chain; and
at least one computing device having at least one processor configured to execute instructions using portions of associated memory to:
receive the positional information from the location determination subsystem;
extract positional values from the positional information;
process the positional values of the tracking device to identify motion primitives representing the respective characteristic motions imparted on the tracking device by the material handling devices as the tracking device travels through the material handling devices;
apply a modeling tool to the identified motion primitives to produce a three-dimensional positional path of the tracking device as the tracking device travels through the material handling devices; and
output the three-dimensional positional path, wherein
the three-dimensional positional path represents travel of the agricultural bulk commodity along the agricultural bulk commodity supply chain,
a size of the tracking device is in a range of 1 cubic centimeter to 5 cubic centimeters,
a shape of the tracking device is spherical, semi-spherical, or polygonal,
the material handling devices include at least one of a linear conveyor that imparts a linear motion primitive, an auger or screw conveyor that imparts a helical motion primitive, a projectile manifold that imparts a projectile motion primitive, and a vibrational conveyor, conveyor belt, or screening equipment that imparts a respective motion primitive,
the processor is configured to process the positional values to identify at least one of the linear motion primitive, helical motion primitive, projectile motion primitive, and the respective motion primitives of the vibrational conveyor, conveyor belt, and screening equipment,
the three-dimensional positional path is received by a sorting device arranged at a position along the agricultural bulk commodity supply chain, the sorting device being in communication with the tracking device and/or the processor, and
when the tracking device reaches the sorting device, the sorting device is configured to direct the agricultural bulk commodity within which the tracking device is entrained to a particular destination based on the travel of the agricultural bulk commodity along the agricultural bulk commodity supply chain prior to the sorting device.

2. The traceability system of claim 1, wherein
the tracking device is a sensor pack that includes at least one of a Global Positioning System (GPS) module configured to determine GPS coordinates of the tracking device and an Inertial Measurement Unit (IMU) module configured to determine IMU values of the tracking device, the GPS coordinates and/or IMU values being included in the positional information, the GPS module and IMU module forming at least a portion of the location determination subsystem, and
the positional information is stored in memory of the tracking device and transmitted to the computing device.

3. The traceability system of claim 1, wherein
the tracking device includes a passive radio frequency (RF) tag that is configured to emit a tracking signal when bombarded by radio waves from an interrogating RF tag sensor, the passive radio frequency tag and interrogating RF tag sensor forming at least a portion of the location determination subsystem.

4. The traceability system of claim 1, wherein
the location determination subsystem includes one or a plurality of stationary sensors positioned external to the tracking device and configured to detect a position of the tracking device to thereby determine the positional information, the stationary sensors being selected from the group comprising wireless access points and RF tag sensors.

5. The traceability system of claim 1, wherein
the agricultural bulk commodity is a crop from an agricultural management zone,
the tracking device is placed within a predetermined crop volume of the crop at a point of harvest, and
the computing device maps a positional path of the crop volume of the crop via the tracking device as it moves through the agricultural bulk commodity supply chain.

6. The traceability system of claim 5, wherein
the tracking device is one of a plurality of tracking devices,
the agricultural management zone is one of a plurality of agricultural management zones, each agricultural management zone of the plurality of agricultural management zones having at least one respective crop, and
at least one tracking device of the plurality of tracking device is placed within a predetermined crop volume of each respective crop at a point of harvest, such that a positional path of each respective crop can be mapped by the computing device via a respective tracking device.

7. The traceability system of claim 1, wherein
the tracking device includes an environmental sensor configured to track and record environmental conditions.

8. The traceability system of claim 1, wherein
the agricultural bulk commodity is selected from the group consisting of corn, soy, wheat, coffee, and cacao.

9. A method for tracing an agricultural bulk commodity through an agricultural bulk commodity supply chain, the method comprising:
placing, in the agricultural bulk commodity traveling along the agricultural bulk commodity supply chain, a tracking device, the tracking device being similar in size to a single unit of the bulk commodity, a size of the tracking device being in a range of 1 cubic centimeter to 5 cubic centimeters and a shape of the tracking device being spherical, semi-spherical, or polygonal such that it remains entrained within the agricultural bulk commodity and is conveyed along with the agricultural bulk commodity through material handling devices throughout the agricultural bulk commodity supply chain, the material handling devices imparting respective characteristic motions on the tracking device, the material handling devices including at least one of a linear conveyor that imparts a linear motion primitive, an auger or screw conveyor that imparts a helical motion primitive, a projectile manifold that imparts a projectile motion primitive, and a vibrational conveyor, conveyor belt, or screening equipment that imparts a respective motion primitive;
determining, by a location determination subsystem, positional information of the tracking device while the tracking device is traveling along the agricultural bulk commodity supply chain;
receiving, from the location determination subsystem, the positional information of a tracking device;
extracting positional values from the positional information;
processing the positional values of the tracking device to identify motion primitives representing the respective characteristic motions imparted on the tracking device by the material handling devices as the tracking device travels through the material handling devices, the motion primitives including at least one of the linear motion primitive, helical motion primitive, projectile motion primitive, and the respective motion primitives of the vibrational conveyor, conveyor belt, and screening equipment;
applying a modeling tool to the identified motion primitives to produce a three-dimensional positional path of the tracking device as the tracking device travels through the material handling devices;
outputting the three-dimensional positional path, the three-dimensional positional path represents travel of the agricultural bulk commodity along the agricultural bulk commodity supply chain,
receiving, by a sorting device arranged at a position along the agricultural bulk commodity supply chain, the three-dimensional positional path, the sorting device being in communication with the tracking device and/or the processor, and
when the tracking device reaches the sorting device, directing the agricultural bulk commodity within which the tracking device is entrained to a particular destination based on the travel of the agricultural bulk commodity along the agricultural bulk commodity supply chain prior to the sorting device.

10. The method of claim 9, wherein the location determination subsystem includes:
a Global Positioning System (GPS) module of the tracking device;
an Inertial Measurement Unit (IMU) module of the tracking device; and/or
a wireless communication module of the tracking device and wireless access points external to the tracking device that are configured to perform wireless triangulation based on signal strength.

11. The method of claim 10, the method further comprising:
correcting errors in the positional values of positional information from the GPS module, IMU module, and/or wireless triangulation via sensor fusion with an Extended Kalman Filter model.

12. The method of claim 9, wherein
the location subsystem includes a passive radio frequency (RF) tag of the tracking device and RF tag sensor external to the RF tag.

13. The method of claim 9, wherein
the agricultural bulk commodity is a crop from an agricultural management zone, and
the method further comprises:
placing the tracking device within a predetermined crop volume of the crop at a point of harvest; and
mapping, by the computing device, a positional path of the crop volume of the crop via the tracking device as it moves through the agricultural bulk commodity supply chain.

14. The method of claim 13, wherein
the tracking device is one of a plurality of tracking devices,
the agricultural management zone is one of a plurality of agricultural management zones, each agricultural management zone of the plurality of agricultural management zones having at least one respective crop, and at least one tracking device of the plurality of tracking devices is placed within a predetermined crop volume of each respective crop at a point of harvest, such that a positional path of each respective crop can be mapped by the computing device via a respective tracking device.

15. The method of claim 9, the method further comprising:
selecting the agricultural bulk commodity from the group consisting of corn, soy, wheat, coffee, and cacao.

16. The method of claim 9, further comprising:
directing, via the sorting device, the agricultural bulk commodity to travel along one of a plurality of different supply paths, based upon information from the tracking device.

17. A traceability system for an agricultural supply chain, the traceability system comprising:
a plurality of sensor packs, each sensor pack of the plurality of sensor packs including at least one Global Positioning System (GPS) module and at least one Inertial Measurement Unit (IMU) module, and each sensor pack of the plurality of sensor packs being configured to transmit a signal indicating positional information of the respective sensor pack; and
a computing system including at least one processor configured to execute instructions using portions of associated memory to:
receive and store the positional information from each sensor pack of the plurality of sensor packs;
extract positional values from the positional information of each sensor pack;
process the positional values of each sensor pack of the plurality of sensor packs to identify motion primitives;
apply a modeling tool to the identified motion primitives to produce a respective three-dimensional positional path for each sensor pack of the plurality of sensor packs; and
output the respective three-dimensional positional path of each sensor pack by transmitting data representing the respective three-dimensional positional path of each sensor pack as each sensor pack travels through material handling devices to a storage location or downstream program for further processing or displaying the positional path via a user interface on a display, wherein
the agricultural supply chain includes commodities from a plurality of agricultural management zones,
each agricultural management zone of the plurality of agricultural management zones having at least one respective crop,
at least one sensor pack of the plurality of sensor packs is placed within a predetermined crop volume of each respective crop at a point of harvest, the at least one sensor pack being similar in size to a single unit of the respective crop such that it remains entrained within the predetermined crop volume and is conveyed along with the predetermined crop volume through the material handling devices throughout the agricultural supply chain, the material handling devices imparting respective characteristic motions on the at least one sensor pack,
a size of the sensor pack is in a range of 1 cubic centimeter to 5 cubic centimeters,
a shape of the sensor pack is spherical, semi-spherical, or polygonal,
the material handling devices include at least one of a linear conveyor that imparts a linear motion primitive, an auger or screw conveyor that imparts a helical motion primitive, a projectile manifold that imparts a projectile motion primitive, and a vibrational conveyor, conveyor belt, or screening equipment that imparts a respective motion primitive,
the processor is configured to process the positional values to identify at least one of the linear motion primitive, helical motion primitive, projectile motion primitive, and the respective motion primitives of the vibrational conveyor, conveyor belt, and screening equipment,
the motion primitives represent the respective characteristic motions imparted on the at least one sensor pack by the material handling devices as the at least one sensor pack travels through the material handling devices,
the respective three-dimensional positional path of the at least one sensor pack represents travel of the predetermined crop volume of each respective crop along the agricultural supply chain from the point of harvest to a point of storage or distribution,
the three-dimensional positional path is received by a sorting device arranged at a position along the agricultural supply chain, the sorting device being in communication with the at least one sensor pack and/or the processor, and
when the at least one sensor pack reaches the sorting device, the sorting device is configured to direct the predetermined crop volume within which the at least one sensor pack is entrained to a particular destination based on the travel of the predetermined crop volume along the agricultural supply chain prior to the sorting device.

* * * * *